(12) United States Patent
Luo

(10) Patent No.: US 11,930,292 B2
(45) Date of Patent: Mar. 12, 2024

(54) DEVICE STATE MONITORING METHOD AND APPARATUS

(71) Applicant: HANGZHOU HIKVISION DIGITAL TECHNOLOGY CO., LTD., Hangzhou (CN)

(72) Inventor: Yuhua Luo, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 414 days.

(21) Appl. No.: 17/285,551

(22) PCT Filed: Oct. 15, 2019

(86) PCT No.: PCT/CN2019/111323
§ 371 (c)(1),
(2) Date: Apr. 15, 2021

(87) PCT Pub. No.: WO2020/078355
PCT Pub. Date: Apr. 23, 2020

(65) Prior Publication Data
US 2021/0385406 A1 Dec. 9, 2021

(30) Foreign Application Priority Data
Oct. 17, 2018 (CN) .......................... 201811211115.X

(51) Int. Cl.
*H04N 5/77* (2006.01)
*G06F 11/30* (2006.01)

(52) U.S. Cl.
CPC ........... *H04N 5/77* (2013.01); *G06F 11/3024* (2013.01); *G06F 11/3034* (2013.01); *G06F 11/3041* (2013.01)

(58) Field of Classification Search
None
See application file for complete search history.

(56) References Cited

U.S. PATENT DOCUMENTS 9,749,282 B2    8/2017  Jain et al.
9,983,812 B1 *  5/2018  Don .................... G06F 11/2094
(Continued)

FOREIGN PATENT DOCUMENTS

CN    101309277    11/2008
CN    101651665     2/2010
(Continued)

OTHER PUBLICATIONS

Office Action and Search Report issued in Chinese Appln. No. 201811211115.X, dated Jul. 31, 2020, 13 pages (With English Translation).
(Continued)

*Primary Examiner* — Omar S Parra
(74) *Attorney, Agent, or Firm* — Fish & Richardson P.C.

(57) ABSTRACT

The present application provides a method and apparatus for monitoring a device state. The method includes: detecting one or more current values of one or more state parameters; for each state parameter of the one or more state parameters, determining whether the current value of the state parameter changes relative to a recorded value of the state parameter; and reporting the current value of the state parameter to a client through a connection between the present device and the client in response to determining that the current value of the state parameter changes relative to the recorded value of the state parameter.

20 Claims, 2 Drawing Sheets

(56) References Cited

U.S. PATENT DOCUMENTS

| | | |
|---|---|---|
| 2002/0169734 A1 | 11/2002 | Giel et al. |
| 2005/0091219 A1 | 4/2005 | Karachale et al. |
| 2012/0290740 A1 | 11/2012 | Tewari et al. |
| 2016/0088093 A1 | 3/2016 | Yung et al. |
| 2017/0134395 A1 | 5/2017 | Enns et al. |
| 2019/0179583 A1 | 6/2019 | Igarashi |

FOREIGN PATENT DOCUMENTS

| | | |
|---|---|---|
| CN | 102821011 | 12/2012 |
| CN | 104202565 | 12/2014 |
| CN | 105847052 | 8/2016 |
| CN | 106453657 | 2/2017 |
| WO | 2018037609 | 3/2018 |

OTHER PUBLICATIONS

PCT International Search Report in International Appln. No. PCT/CN2019/111323, dated Jan. 2, 2020, 4 pages (With English Translation).

Extended European Search Report Issued in European Appln. No. 19874086.2, dated Oct. 6, 2021, 8 pages.

PCT International Written Opinion in International Appln. No. PCT/CN2019/111323, dated Jan. 2, 2020, 8 pages (With English Translation).

\* cited by examiner

DEVICE STATE MONITORING METHOD AND APPARATUS

CROSS REFERENCE TO RELATED APPLICATIONS

This application is a National Stage application under 35 U.S.C. § 371 of International Application No. PCT/CN2019/111323, having an International Filing Date of Oct. 15, 2019, which claims priority to Chinese Patent Application No. 201811211115.X entitled "METHOD AND APPARATUS FOR MONITORING DEVICE STATE" filed on Oct. 17, 2018 the entire content of which is incorporated herein by reference.

TECHNICAL FIELD

The present application relates to the field of communication technologies, and in particular to a method and apparatus for monitoring a device state.

BACKGROUND

In the field of video monitoring, a client is to monitor various states (e.g. central processing unit (CPU) state, hardware state, channel state, magnetic disk state and input/output (I/O) state and the like) of a Network Video Recorder (NVR) device in a video monitoring system.

At present, the client sends at regular time, by patrol inspection, a state query command (e.g. Management Information Database (MIP) command) to an NVR device in each video monitoring system. After receiving the state query command, the NVR device obtains a state parameter corresponding to each state of the present device and returns the obtained state parameter of each state to the client, so that the client realizes monitoring for the states of each NVR device. However, when a large number of NVR devices are to be monitored, a high data-receiving pressure will be brought to the client.

SUMMARY

In view of this, the present application provides a method and apparatus for monitoring a device state.

According to a first aspect of examples of the present application, there is provided a method of monitoring a device state, which is applied to an electronic device. The method includes: detecting one or more current values of one or more state parameters; for each state parameter of the one or more state parameters, determining whether the current value of the state parameter changes relative to a recorded value of the state parameter; in response to determining that the current value of the state parameter changes relative to the recorded value of the state parameter, reporting the current value of the state parameter to a client through a connection between the electronic device and the client.

According to a second aspect of examples of the present application, there is provided an apparatus for monitoring a device state, which is applied to an electronic device: The apparatus includes: a detecting module, configured to detect one or more current values of one or more state parameters; a determining module, configured to for each state parameter of the one or more state parameters, determine whether the current value of the state parameter changes relative to a recorded value of the state parameter; a change reporting module, configured to report the current value of the state parameter to a client through a connection between the electronic device and the client in response to determining that the current value of the state parameter changes relative to the recorded value of the state parameter.

According to a third aspect of examples of the present application, there is provided an electronic device which includes a readable storage medium and a processor, where the readable storage medium is configured to store machine-executable instructions and the processor is configured to read the machine-executable instructions on the readable storage medium and execute the instructions to perform the steps of the above first aspect.

According to a fourth aspect of examples of the present application, there is provided a computer readable storage medium storing computer programs, where the computer programs are executed by a processor to perform the steps of the above first aspect.

DETAILED DESCRIPTION OF THE EMBODIMENTS

Figure 1:
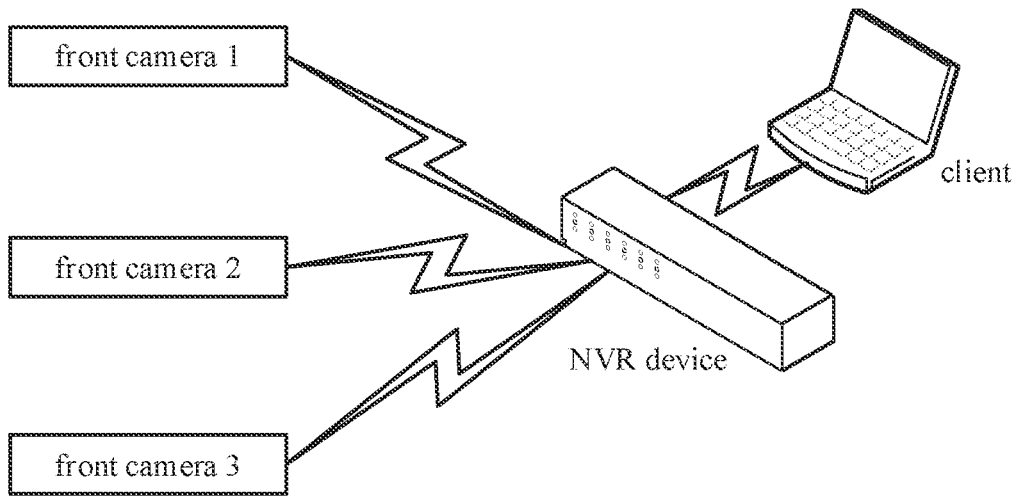
FIG. 1 is a structural diagram of a video monitoring system according to an example of the present application.

Example embodiments will be described in detail herein with the examples thereof expressed in the drawings. When the following descriptions involve the drawings, like numerals in different drawings represent like or similar elements unless stated otherwise. The implementations described in the following example embodiments do not represent all implementations consistent with the present application. On the contrary, they are merely examples of an apparatus and a method consistent with some aspects of the present application described in detail in the appended claims.

The terms used in the present application are for the purpose of describing particular examples only, and are not intended to limit the present application. Terms determined by "a". "the" and "said" in their singular forms in the present application and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present application to describe various information, such information should not be limited to these terms. These terms are only used to distinguish one category of information from another. For example, without departing from the scope of the present application, first information may be referred as second information; and similarly, the second information may also be referred as the first information. Depending on the context, the term "if" as used herein may be interpreted as "when" or "upon" or "in response to determining".

FIG. 1 is a structural diagram of a video monitoring system according to an example of the present application.

The system in FIG. 1 includes front cameras (three front cameras exemplarily shown in FIG. 1), an NVR device and a client. The front cameras are configured to collect video data of places surrounding the front camera, the NVR device is configured to store video data transmitted by the front cameras through a network, and the client is configured to monitor various states of the NVR device through an installed video monitoring management program (Software Development Kit (SDK) package). Further, the client may monitor states of NVR devices in a plurality of video monitoring systems.

At present, the client is to sends at regular time a state query command to the NVR devices to obtain a state parameter of each state of the NVR devices and determines whether an abnormal state exists according to the obtained state parameters. If determining that an abnormal state exists, the client max prompt the abnormal state to a user. However, when the client monitors a large number of NVR devices, a high data-receiving pressure will be brought to the client. Furthermore, some state parameters usually do not change frequently. In this case, if the state parameters of all states are returned for each query, network traffic will be wasted.

Based on the above, the NVR device may detect one or more current values of one or more state parameters. When determining that a current value of a state parameter changes relative to a recorded value of the state parameter, the NVR device may report the current value of the state parameter to the client through a connection between the present device and the client.

It can be known from the above descriptions that for the one or more current values of the state parameters detected each time, only one or more changed parameter values are reported by the NVR device instead of querying the NVR device each state at regular time by the client, thereby reducing network interaction of the device and the client. Since the client only receives the values of the state parameters that changed rather than the values of all state parameters, the data-receiving pressure of the client may be reduced and the network traffic may be saved. Especially in a poor network environment, real-timeness of state reporting may be improved.

It is to be noted that the technical solution of the present application may monitor state of various types of electronic devices and is not limited to monitoring the state of the NVR device.

Figure 2:
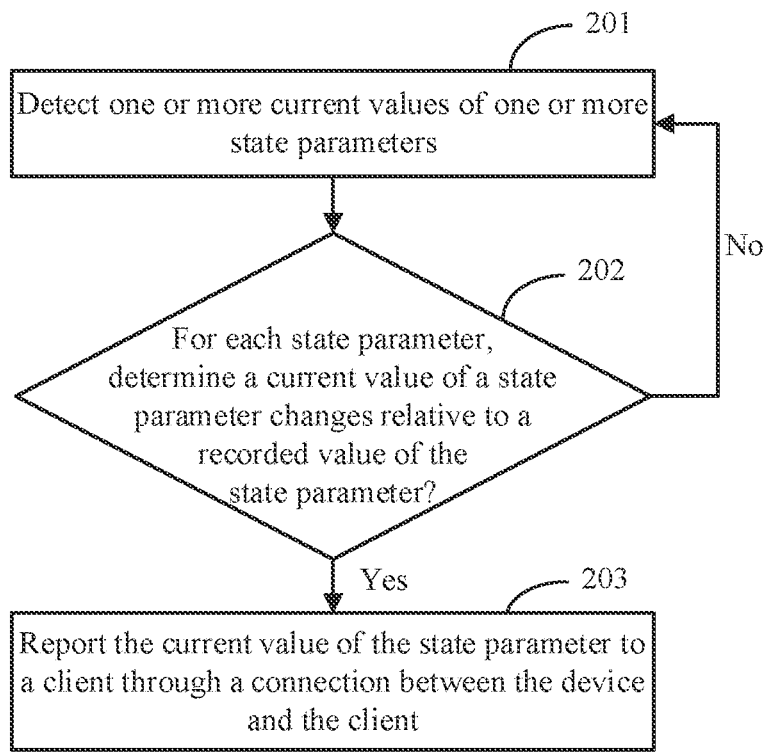
FIG. 2 is an exemplary flowchart of a method of monitoring a device state according to an example of the present application.

FIG. 2 is an exemplary flowchart of a method of monitoring a device state according to an example of the present application. The method of monitoring a device state may be applied to an electronic device, Detailed descriptions will be made below with NVR device as the electronic device. As shown in FIG. 2, the method of monitoring a device state may include the following steps.

At step 201, one or more current values of one or more state parameters are detected.

In an example, a connection is established between the present device and a client before step 201 is performed. The connection is established in the following process: when a connection request is received from a client, a full reporting identifier corresponding to the client is generated based on the connection request and recorded, and then added to a first connection response and sent to the client, thereby successfully establishing the connection between the present device and the client. Next, a value of each state parameter of the present device is obtained and recorded and then reported to the client through the connection.

After being employed in a video monitoring system, the NVR device may generate and record a full reporting identifier corresponding to the client upon receiving a connection request (including a null full reporting identifier) from the client. The full reporting identifier is configured to indicate whether to perform full reporting after connection establishment. The full reporting identifier may be a random identifier, for example, a Globally Unique Identifier (GUID). Because the full reporting identifier is generated during the process of establishing the connection, after the connection is established, the NVR device is also to report the value of each state parameter obtained and recorded by the present device to the client so that the value of each state parameter recorded in the client is consistent with that recorded by the present device.

In an example, in a process of detecting one or more current values of one or more state parameters, the one or more state parameters are determined according to one or more state identifiers carried in the connection request, and state information of respective state parameters is detected and then converted into easily identifiable values which are then determined as the one or more current values of the respective state parameters. The one or more state parameters may be parameters relating to CPU state (normal or abnormal), channel state (online, offline or whether video is being recorded), hard disk state (sleeping, abnormal and the like), or IO state (on or off), which is not limited herein.

One or more state identifiers corresponding to one or more states that a user desires to monitor may be carried in the connection request sent by the client, that is, the user may subscribe for one or more states according to actual needs, so that the NVR device may only detect state information of the subscribed states, thereby saving network traffic in a state monitoring process. Because the detected state information usually is a character string indicating normal or not or the like, it is difficult for a user to identify the character string. Therefore, the state information may be converted into a value easily identifiable by the user. It is assumed that the state information 0Xabcde of the channel state indicates that channel is online and the state information 0Xabcdf of the channel state indicates that channel is offline. In this case, the state information 0Xabcde may be converted into 0 to indicate channel is online, and the state information 0Xabcdf may be converted into 1 to indicate channel is offline.

It is to be noted that a trigger condition for detecting one or more current values of one or more state parameters may be that detection is performed at an interval of a preset time length and/or detection is performed when a trigger instruction is received, where the trigger instruction may be an instruction input by a user.

At step 202, for each state parameter, it is determined whether the current value of the state parameter changes relative to a recorded value of the state parameter. In a case of no change, step 201 is repeated and in a case of any change, step 203 is performed.

In an example, as mentioned in above step 201, the NVR device reports the values of all state parameters obtained and recorded after the first connection with the client to the client in full amount. Thus, the values of state parameters maintained on the NVR device and the client are synchronous. If the current value of the state parameter subsequently detected is not consistent with the recorded value of the state parameter, it indicates that the state parameter changes and step 203 is performed; if the current value of the state parameter subsequently detected is consistent with the recorded value of the state parameter, it indicates that the state parameter does not change and step 201 is continued.

At step 203, the current value of the state parameter is reported to the client through the connection between the present device and the client.

In an example, after the current value of the state parameter is reported to the client, when a confirmation notification returned by the client is received, the recorded value of the state parameter is updated according to the current value of the state parameter.

In order to verify whether the value reported by the NVR device is received by the client, verification may be realized by a confirmation mechanism, that is, if the conformation notification returned by the client is received, it indicates that the client has received the reported value, and update has been performed in time. Thus, the NVR device may update the recorded value of the state parameter according to the current value of the state parameter, so that the value maintained locally is synchronous with the client.

For the above process from the step 201 to the step 203, it is to be noted that in order to avoid the case that the values of all state parameters are to be reported in full amount to the client after each reconnection of the NVR device and the client, and especially the case that reconnection of the NVR device and the client may be triggered repeatedly in a severe network jitter, when it is detected that the NVR device and the client are disconnected after being connected, a preset timer (for example, a preset time length is 10 minutes) is started. If a reconnection request is received from the client before the timer expires and the reconnection request carries a full reporting identifier same as the locally-recorded one corresponding to the client, the timer is turned off and a second connection response is sent to the client to reconnect with the client; if a reconnection request is not received from the client when the timer expires, the locally-recorded full reporting identifier corresponding to the client is deleted. When a reconnection request is received from the client after the timer expires, a full reporting identifier corresponding to the client is regenerated based on the reconnection request and recorded and then added to the first connection response and sent to the client to reconnect with the client, and next, the values of various state parameters of the present device are obtained and recorded and then reported to the client through the connection.

The disconnection between the present device and the client may be detected in the following process: a heart beat packet is sent to the client at an interval of a preset heart beat period, and when no heart beat response returned by the client is received within a preset number of heart beat periods (e.g. three periods), it is determined that the present device and the client are disconnected.

The preset timer is used to indicate tolerable disconnection duration. If a reconnection request is received from the client before the timer expires, the timer is turned off; if a reconnection request is not received from the client when the timer expires, it indicates that the recorded full reporting identifier turns invalid and the recorded full reporting identifier corresponding to the client is deleted; when a reconnection request is received from the client after the timer expires, it indicates that the disconnection duration is too long and the values of various state parameters in the present device may have changed which however is not known by the client. Further, the locally-recorded full reporting identifier is already deleted and therefore a full reporting identifier corresponding to the client is to be regenerated and recorded so that the values of various state parameters of the present device can be obtained and recorded again and then reported to the client in full amount through the connection after the connection between the present device and the client is successfully established. As a result, the values of the state parameters maintained on the client and the present device are synchronous.

It can be known that it is guaranteed that several reconnections triggered in a severe network jitter will not cause several full reportings by deleting invalid full reporting identifier upon expiry of the timer, thereby avoiding the problem of data storm occurring between the client and the present device.

It is further to be noted that if the present device is restarted, when the present device receives a reconnection request from the client, the present device deletes the locally-recorded full reporting identifier, regenerates and records a full reporting identifier and adds the regenerated full reporting identifier to the first connection response and then reports the first connection response to the client and then obtains and records the values of various state parameters of the present device again and reports the values of various state parameters to the client through the connection, so that the values of state parameters maintained on the client and the present device are synchronous.

In an example of the present application, the one or more current values of the one or more state parameters may be detected. When it is determined that a current value of a state parameter changes relative to a recorded value of the state parameter, the current value of the state parameter is reported to the client through the connection between the present device and the client and the recorded value of the state parameter is updated using the current value of the state parameter.

It can be known from the above descriptions that for the one or more current values of the one or more state parameters detected each time, only one or more changed values are reported instead of querying by the client each state at regular time, thereby reducing network interaction of the device and the client. Further, since the client only receives the values of the state parameters that changed rather than the values of all state parameters, the data-receiving pressure of the client may be reduced and the network traffic may be saved. Especially in a poor network environment, the real-timeness of the state reporting may be improved.

Figure 3:
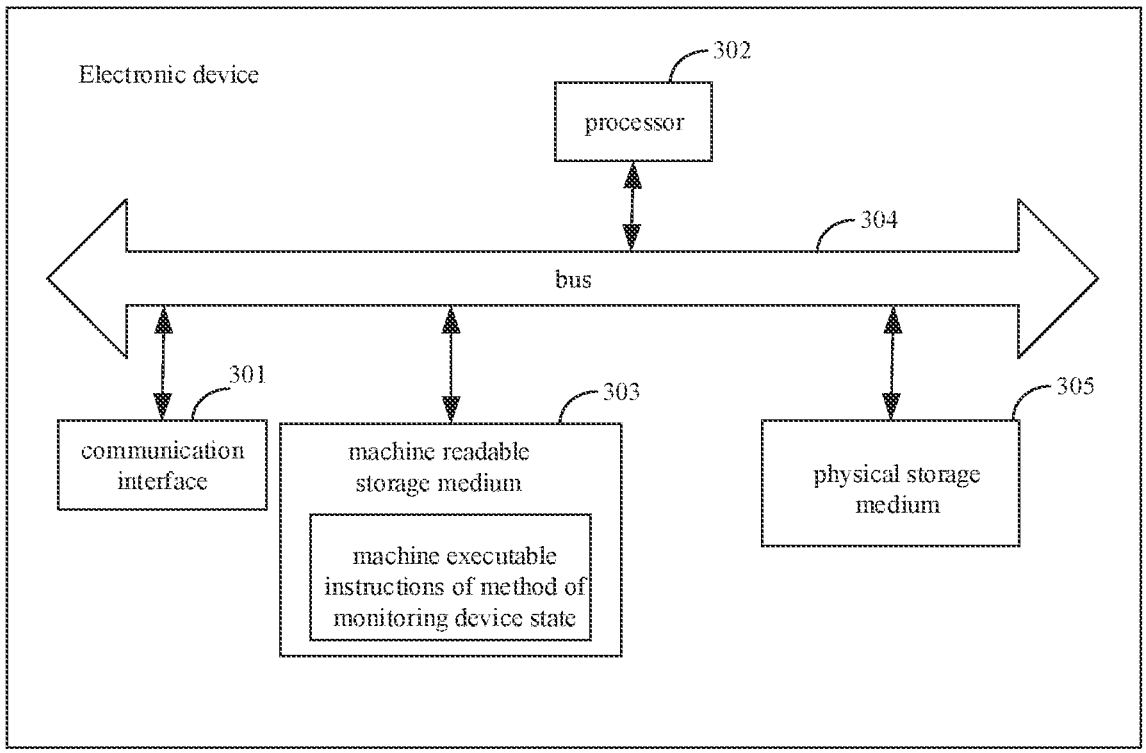
FIG. 3 is a schematic diagram of a hardware structure of an electronic device according to an example of the present application.

FIG. 3 is a schematic diagram of a hardware structure of an electronic device according to an example of the present application. The electronic device includes a communication interface 301, a processor 302, a machine-readable storage medium 303, a bus 304 and a physical storage medium 305, where the communication interface 301, the processor 302, the machine-readable storage medium 303 and the physical storage medium 305 communicate with each other via the bus 304. The processor 302 may perform the above method of monitoring a device state by reading and executing machine executable instructions corresponding to control logic of the method of monitoring a device state and stored on the machine readable storage medium 302. The specific contents of the method are already described in the above examples and will not be repeated herein.

The machine readable storage medium 303 mentioned herein may be any of electronic, magnetic, optical or other physical storage devices and may contain or store information such as executable instructions, data and so on. For example, the machine readable storage medium may be a volatile memory, a non-volatile memory or a similar storage medium. Specifically, the machine readable storage medium 303 may be a Radom Access Memory (RAM), a flash memory, a storage drive (e.g. hard disk drive), any type of storage disk (e.g., compact disk, Digital Video Disk (DVD)), or a similar storage medium, or a combination thereof.

Figure 4:
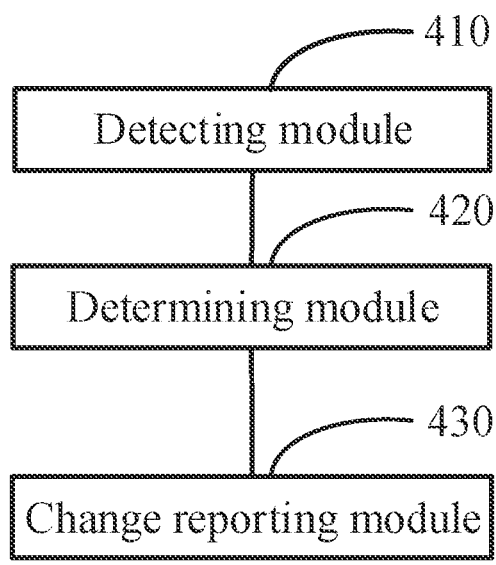
FIG. 4 is an exemplary structural diagram of an apparatus for monitoring a device state according to an example of the present application.

FIG. 4 is an exemplary structural diagram of an apparatus for monitoring a device state according to an example of the present application. The apparatus for monitoring a device state is applied to an electronic device. As shown in FIG. 4, the apparatus for monitoring a device state includes:

a detecting module 410, configured to detect one or more current values of one or more state parameters;

a determining module 420, configured to for each state parameter, determine whether the current value of the state parameter changes relative to a recorded value of the state parameter;

a determining module 420, configured to determine whether the current value of the state parameter changes relative to a recorded value of the state parameter;

a change reporting module 430, configured to report the current value of the state parameter to a client through a connection between the present device and the client when a change is determined.

In an optional implementation, the apparatus further includes (not shown in FIG. 4):

a connection establishing module, configured to: receive a connection request from the client; generate and record a full reporting identifier corresponding to the client based on the connection request, where the full reporting identifier is configured to indicate whether to perform full reporting after connection establishment; add the generated full reporting identifier to a first connection response and send the first connection response to the client to successfully establish a connection between the present device and the client; and then obtain and record the values of various state parameters of the present device and report the values of various state parameters to the client through the connection.

In an optional implementation, the apparatus further includes (not shown in FIG. 4):

a reconnecting module, configured to: start a preset timer (e.g. a preset time length is 10 minutes) when detecting that the present device and the client are disconnected; if a reconnection request is received from the client before the timer expires and the reconnection request carries a full reporting identifier same as a locally-recorded full reporting identifier corresponding to the client, turn off the timer and send a second connection response to the client to reconnect with the client; if a reconnection request is not received from the client when the timer expires, delete the locally-recorded full reporting identifier corresponding to the client; when a reconnection request is received from the client after the timer expires, regenerate and record a full reporting identifier corresponding to the client based on the reconnection request, and add the regenerated full reporting identifier to the first connection response and then send the first connection response to the client to reconnect with the client; and then obtain and record the values of various state parameters of the present device and report the values of various state parameters to the client through the connection.

In an optional implementation, the one or more state parameters refer to one or more state parameters corresponding to one or more state identifiers carried in the connection request; and values or initial values of the state parameters are easily identifiable identifiers determined based on the obtained state information.

In an optional implementation, the connection request sent by the client may carry one or more state identifiers corresponding to one or more states the user desires to monitor, that is, the user may subscribe for one or more states according to actual needs so that the NVR device only detects the state information of the subscribed states.

In an optional implementation, the apparatus further includes (not shown in FIG. 4):

a confirming module, configured to update the recorded value of the state parameter using the current value of the state parameter when receiving a confirmation notification from the client after the change reporting module 430 reports the current value of the state parameter to the client through the connection between the present device and the client.

In an optional implementation, the detecting module 410 is specifically configured to: detect one or more current values of the one or more state parameters at an interval of a preset time length; and/or, when receiving a trigger instruction, detect one or more current values of the one or more state parameters.

Details of the implementation process of the functions and effects of different units in the above-described apparatus may refer to the implementation process of corresponding steps in the above-described method, which will not be redundantly described herein.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

Other implementations of the present application will be apparent to those skilled in the art from consideration of the specification and practice of the present application herein. The present application is intended to cover any variations, uses, or adaptations of the present application that follow the general principles thereof and include common knowledge or conventional technical means in the related art that are not disclosed in the present application. The specification and examples are considered as exemplary only, with a true scope and spirit of the present application being indicated by the following claims.

It is noted that the terms "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The foregoing application is merely illustrative of preferred examples of the present application but not intended to limit the present application, and any modifications, equivalent substitutions, adaptations thereof made within the spirit and principles of the present application shall be encompassed in the scope of protection of the present application.

The invention claimed is:

1. A method of monitoring a device state, the method comprising:

detecting one or more current values of one or more state parameters;

for each state parameter of the one or more state parameters,
  determining whether the current value of the state parameter changes relative to a recorded value of the state parameter; and
  in response to determining that the current value of the state parameter changes relative to the recorded value of the state parameter, reporting the current value of the state parameter to a client through a connection between an electronic device and the client;
starting a preset timer in response to detecting that the electronic device and the client are disconnected;
if a reconnection request is received from the client before the timer expires and the reconnection request carries a full reporting identifier same as a full reporting identifier corresponding to the client which is locally recorded by the electronic device, turning off the timer and sending a second connection response to the client to reconnect with the client; and
if a reconnection request is not received from the client when the timer expires, deleting the full reporting identifier corresponding to the client which is locally recorded by the electronic device.

2. The method according to claim 1, wherein, before detecting the one or more current values of the one or more state parameters, the method further comprises:
receiving a connection request from the client;
generating and recording a full reporting identifier corresponding to the client based on the connection request, wherein the full reporting identifier is configured to indicate whether to perform full reporting after connection;
adding the generated full reporting identifier to a first connection response and then sending the first connection response to the client to successfully establish the connection between the electronic device and the client;
obtaining and recording values of the one or more state parameters of the electronic device; and
reporting the values of the one or more state parameters to the client through the connection between the electronic device and the client.

3. The method according to claim 2, wherein,
the one or more state parameters are one or more state parameters corresponding to one or more state identifiers carried in the connection request; and
values or initial values of the one or more state parameters are easily identifiable identifiers determined according to obtained state information.

4. The method according to claim 1, further comprising:
in response to receiving a confirmation notification from the client, updating the recorded value of the state parameter using the current value of the state parameter.

5. The method according to claim 1, wherein detecting the one or more current values of the one or more state parameters comprises at least one of:
detecting the one or more current values of the one or more state parameters at an interval of a preset time length; or
detecting the one or more current values of the one or more state parameters upon receiving a trigger instruction.

6. The method according to claim 1, wherein detecting that the electronic device and the client are disconnected comprises:
sending a heart beat packet to the client at an interval of a preset heart beat period, and
in response to determining that no heart beat response returned by the client is received within a preset number of heart beat periods, determining that the electronic device and the client are disconnected.

7. The method according to claim 1, wherein the full reporting identifier comprises a globally unique identifier (GUID).

8. The method according to claim 1, further comprising:
in response to determining that a reconnection request is received from the client after the timer expires, regenerating and recording a full reporting identifier corresponding to the client based on the reconnection request, adding the regenerated full reporting identifier to a first connection response and then sending the first connection response to the client to reconnect with the client, obtaining and recording values of the one or more state parameters of the electronic device and reporting the values of the one or more state parameters to the client through the connection.

9. The method according to claim 1, wherein the full reporting identifier corresponding to the client is stored in the electronic device and sent to the client before the connection is disconnected.

10. An electronic device, comprising:
at least one processor, and
at least one non-transitory computer readable storage medium storing machine-executable instructions for execution by the at least one processor to perform operations comprising:
  detecting one or more current values of one or more state parameters;
  for each state parameter of the one or more state parameters,
    determining whether the current value of the state parameter changes relative to a recorded value of the state parameter; and
    in response to determining that the current value of the state parameter changes relative to the recorded value of the state parameter, reporting the current value of the state parameter to a client through a connection between the electronic device and the client;
  starting a preset timer in response to detecting that the electronic device and the client are disconnected;
  if a reconnection request is received from the client before the timer expires and the reconnection request carries a full reporting identifier same as a full reporting identifier corresponding to the client which is locally recorded by the electronic device, turning off the timer and sending a second connection response to the client to reconnect with the client; and
  if a reconnection request is not received from the client when the timer expires, deleting the full reporting identifier corresponding to the client which is locally recorded by the electronic device.

11. The electronic device according to claim 10, wherein, before detecting the one or more current values of the one or more state parameters, the operations further comprise:
receiving a connection request from the client;
generating and recording a full reporting identifier corresponding to the client based on the connection request, wherein the full reporting identifier is configured to indicate whether to perform full reporting after connection;

adding the generated full reporting identifier to a first connection response and then sending the first connection response to the client to successfully establish the connection between the electronic device and the client;

obtaining and recording values of the one or more state parameters of the electronic device; and reporting the values of the one or more state parameters to the client through the connection between the electronic device and the client.

12. The electronic device according to claim 11, wherein, the one or more state parameters are one or more state parameters corresponding to one or more state identifiers carried in the connection request; and values or initial values of the one or more state parameters are easily identifiable identifiers determined according to obtained state information.

13. The electronic device according to claim 10, wherein the operations further comprise:

in response to receiving a confirmation notification from the client, updating the recorded value of the state parameter using the current value of the state parameter.

14. The electronic device according to claim 10, wherein detecting the one or more current values of the one or more state parameters comprises at least one of:

detecting the one or more current values of the one or more state parameters at an interval of a preset time length; or detecting the one or more current values of the one or more state parameters upon receiving a trigger instruction.

15. The electronic device according to claim 10, wherein detecting that the electronic device and the client are disconnected comprises:

sending a heart beat packet to the client at an interval of a preset heart beat period, and in response to determining that no heart beat response returned by the client is received within a preset number of heart beat periods, determining that the electronic device and the client are disconnected.

16. A non-transitory computer readable storage medium storing computer programs executable by at least one processor to perform operations comprising:

detecting one or more current values of one or more state parameters;

for each state parameter of the one or more state parameters, determining whether the current value of the state parameter changes relative to a recorded value of the state parameter; and in response to determining that the current value of the state parameter changes relative to the recorded value of the state parameter, reporting the current value of the state parameter to a client through a connection between an electronic device and the client;

starting a preset timer in response to detecting that the electronic device and the client are disconnected;

if a reconnection request is received from the client before the timer expires and the reconnection request carries a full reporting identifier same as a full reporting identifier corresponding to the client which is locally recorded by the electronic device, turning off the timer and sending a second connection response to the client to reconnect with the client; and if a reconnection request is not received from the client when the timer expires, deleting the full reporting identifier corresponding to the client which is locally recorded by the electronic device.

17. The non-transitory computer readable storage medium according to claim 16, wherein the operations further comprise: before detecting the one or more current values of the one or more state parameters, receiving a connection request from the client;

generating and recording a full reporting identifier corresponding to the client based on the connection request, wherein the full reporting identifier is configured to indicate whether to perform full reporting after connection;

adding the generated full reporting identifier to a first connection response and then sending the first connection response to the client to successfully establish the connection between the electronic device and the client;

obtaining and recording values of the one or more state parameters of the electronic device; and reporting the values of the one or more state parameters to the client through the connection between the electronic device and the client.

18. The non-transitory computer readable storage medium according to claim 17, wherein, the one or more state parameters are one or more state parameters corresponding to one or more state identifiers carried in the connection request; and values or initial values of the one or more state parameters are easily identifiable identifiers determined according to obtained state information.

19. The non-transitory computer readable storage medium according to claim 16, wherein the operations further comprise:

in response to receiving a confirmation notification from the client, updating the recorded value of the state parameter using the current value of the state parameter.

20. The non-transitory computer readable storage medium according to claim 16, wherein detecting the one or more current values of the one or more state parameters comprises at least one of:

detecting the one or more current values of the one or more state parameters at an interval of a preset time length; or detecting the one or more current values of the one or more state parameters upon receiving a trigger instruction.

* * * * *